United States Patent
Chen et al.

(10) Patent No.: US 7,483,263 B2
(45) Date of Patent: Jan. 27, 2009

(54) COMPUTER ENCLOSURE (75) Inventors: Yun-Lung Chen, Tu-Cheng (TW); Fa-Ming Jiang, Shenzhen (CN); Deng-Liang Guo, Shenzhen (CN); Gang Su, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 538 days.

(21) Appl. No.: 11/193,731

(22) Filed: Jul. 29, 2005

(65) Prior Publication Data

US 2006/0133023 A1    Jun. 22, 2006

(30) Foreign Application Priority Data

Dec. 17, 2004    (CN) .................... 2004 2 0103107 U (51) Int. Cl.
 *G06F 1/16* (2006.01)
(52) U.S. Cl. .................................. 361/683; 312/223.2
(58) Field of Classification Search ................. 361/679, 361/683; 312/223.1, 223.2, 265.5, 265.6
See application file for complete search history.

(56) References Cited

U.S. PATENT DOCUMENTS

| 5,197,789 | A | | 3/1993 | Lin | 312/223.2 |
| 5,660,297 | A | | 8/1997 | Liu | 220/4.02 |
| 5,743,606 | A | * | 4/1998 | Scholder | 312/223.2 |
| 5,839,804 | A | * | 11/1998 | Ho | 312/223.2 |
| 5,918,956 | A | * | 7/1999 | Scholder | 312/223.2 |
| 5,967,633 | A | * | 10/1999 | Jung | 312/223.2 |
| 5,995,363 | A | * | 11/1999 | Wu | 361/679 |
| 5,997,115 | A | * | 12/1999 | Radloff et al. | 312/222 |
| 6,015,195 | A | * | 1/2000 | Anderson et al. | 312/223.2 |
| 6,053,586 | A | * | 4/2000 | Cook et al. | 312/223.2 |
| 6,161,909 | A | * | 12/2000 | Huang | 312/223.2 |
| 6,354,680 | B1 | * | 3/2002 | Lin et al. | 312/223.2 |
| 6,356,436 | B1 | * | 3/2002 | Buican et al. | 361/683 |
| 6,367,896 | B1 | * | 4/2002 | Peng et al. | 312/223.2 |
| 6,392,874 | B1 | * | 5/2002 | Gan | 361/683 |
| 6,529,371 | B1 | * | 3/2003 | Laio | 361/681 |
| 6,542,356 | B2 | * | 4/2003 | Gan | 361/683 |
| 6,654,236 | B2 | * | 11/2003 | Chen et al. | 361/683 |
| 6,698,853 | B2 | * | 3/2004 | Chen et al. | 312/263 |
| 6,721,183 | B1 | * | 4/2004 | Chen et al. | 361/726 |

(Continued)

FOREIGN PATENT DOCUMENTS

TW    558024    10/2003

*Primary Examiner*—Lisa Lea-Edmonds
(74) *Attorney, Agent, or Firm*—Morris Manning Martin LLP; Tim Tingkang Xia, Esq.

(57) ABSTRACT

A computer enclosure includes a base (10), a cover (100) and a resilient member (80) attached to the base and compressed by the cover. The base has a latching portion (68) disposed thereon. The cover is adapted to being mounted to the base, and has a mounting protrusion (70) projecting therefrom. The mounting protrusion engages with the latching portion for preventing the cover moving in a first direction, thereby securing the cover on the base. The resilient member is attached to the base and compressed by the cover. When the mounting protrusion disengages from the latching portion, the resilient member pushes the cover to move in the first direction due to being released.

20 Claims, 10 Drawing Sheets

U.S. PATENT DOCUMENTS

| | | | |
|---|---|---|---|
| 6,764,146 B2 * | 7/2004 | Chen | 312/223.2 |
| 6,775,144 B2 * | 8/2004 | Gan et al. | 361/727 |
| 6,795,307 B2 * | 9/2004 | Arbogast et al. | 361/683 |
| 6,819,551 B2 * | 11/2004 | Chen | 361/683 |
| 6,924,975 B2 * | 8/2005 | Lai | 361/683 |
| 6,932,447 B2 * | 8/2005 | Chen et al. | 312/223.2 |
| 7,116,551 B2 * | 10/2006 | Erickson et al. | 361/685 |
| 7,152,443 B2 * | 12/2006 | Chang et al. | 70/352 |

\* cited by examiner

COMPUTER ENCLOSURE

BACKGROUND OF THE INVENTION

1. Field of the Invention

The present invention relates to computer enclosures, and particularly to a computer enclosure for conveniently securing a cover to a computer enclosure and removing the cover later therefrom.

2. Background of the Invention

Usually, a top cover is simply screwed to a base of a computer enclosure. This conventional mounting means substantially wastes the time, and thus adds the complexity and difficulty of assembling the top cover to the base and later disassembling therefrom.

An improved mounting means is disclosed in U.S. Pat. No. 5,660,297. A computer enclosure includes an upper cover, a base and a front panel. A non-screw assembled casing for the computer enclosure includes a first coupling section structure, a second coupling section structure and a third coupling section structure. The first coupling section structure includes a plurality of first fastening units provided on the bottom edge of the inner right side of the upper cover and on the bottom edge of the right side of the base. The second coupling section structure includes a plurality of second fastening units provided on the bottom edge of the inner left side of the upper cover and on the bottom edge at the left of the base. And the third coupling section structure includes a plurality of third fastening units provided on the back side of the front panel, the periphery of the front side of the upper cover, and the front side of the base. By assembling the first coupling section structure to the second coupling section structure, the upper cover is positioned on the base in the vertical direction and in the lateral direction; and by assembling the third coupling section structure, the upper cover is positioned in the longitudinal direction along with the front panel, a structure can thus be provided into which the computer enclosure can be fixed without requiring fastening by screws. However, in installation and removal of the upper cover, it is necessary to remove and reinstall later the front panel. This mounting means is still awfully inconvenient in mounting the upper cover to the base.

What is needed, therefore, is a computer enclosure having latching device for conveniently fastening a cover to a base and later removing the cover therefrom.

SUMMARY

A computer enclosure in accordance with a preferred embodiment of the invention includes a base, a cover and a resilient member attached to the base and compressed by the cover. The base has a latching portion disposed thereon. The cover is adapted to being mounted to the base, and has a mounting protrusion projecting therefrom. The mounting protrusion engages with the latching portion for preventing the cover moving in a first direction, thereby securing the cover on the base. The resilient member is attached to the base and compressed by the cover. When the mounting protrusion disengages from the latching portion, the resilient member pushes the cover to move in the first direction due to being released.

Other advantages and novel features of the present invention will be drawn from the following detailed description of preferred embodiment with attached drawings, in which:

DETAIL DESCRIPTION OF PREFERRED EMBODIMENT

Figure 1:
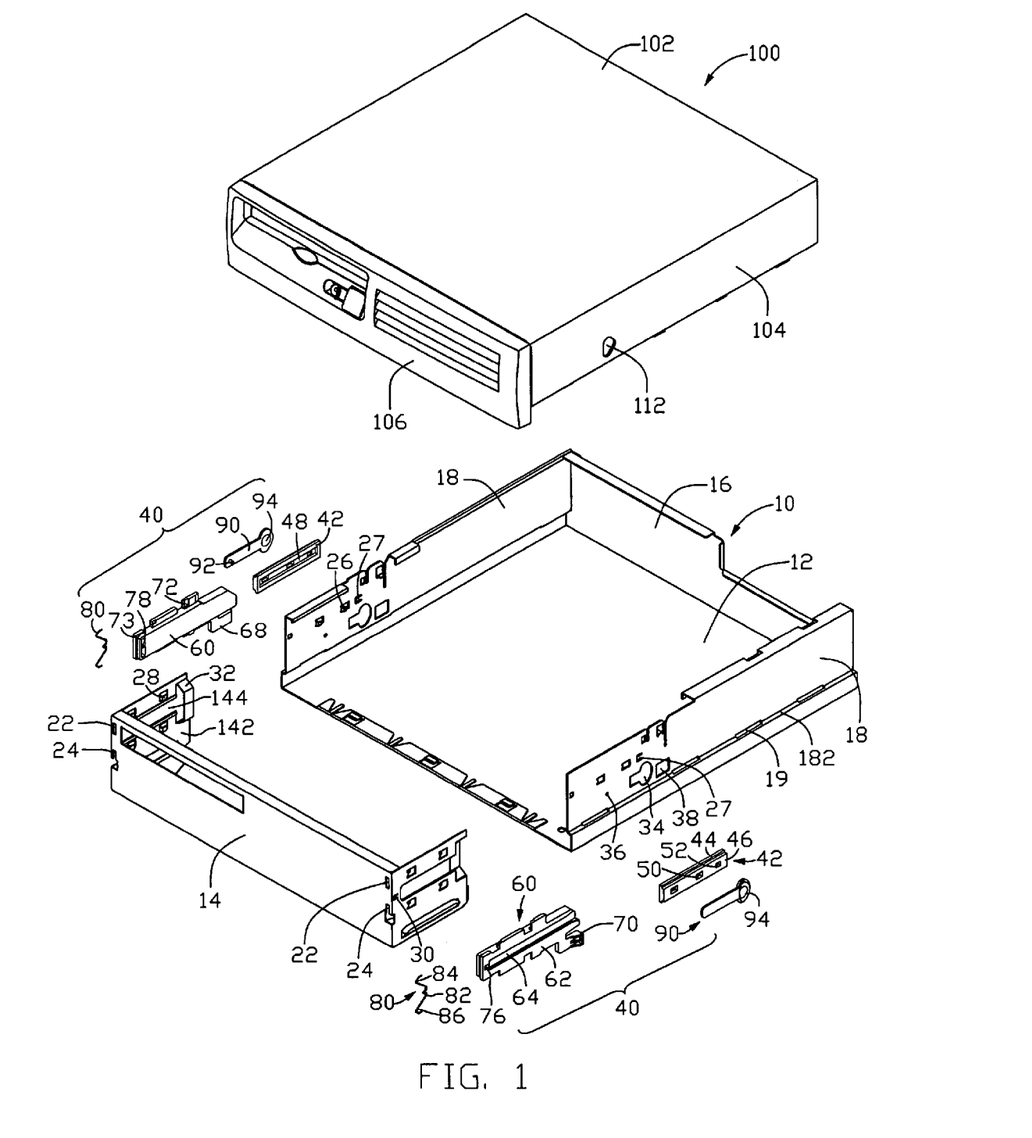
FIG. 1 is an exploded, isometric view of a computer enclosure of a preferred embodiment of the present invention, the computer enclosure including a base, a cover and a pair of latching devices, and the latching device including a pair of guiding member, a sliding member, a resilient member and an operating member.

Referring to FIG. 1, a computer enclosure includes a base 10, a pair of latching devices 40 and a cover 100.

The base 10 has a bottom plate 12, a rear plate 16, a pair of side plates 18 perpendicular to the bottom plate 12 and a front plate 14 mounted to the base 10. The front plate 14 defines two pairs of openings 22, 24. A pair of mounting plates 142 bends perpendicularly from opposite ends of the front plate 14. A slot 144 is defined in the mounting plate 142 with a bridge portion 32 across an open end thereof. Two rows of positioning clips 28 are formed inward at opposite sides of the cutout 144 by stamping.

A step 182 is formed at an outside surface of the side plates 18 of the base 10. A plurality of slits 19 is defined in the step 182. Two positioning clips 26 protrude from the inner surface of the side plate 18 and through the cutout 144 of the front plate 12. A pair of deformable resilient clips 27, 30 is formed at both sides of the positioning clip 26 of the side plate 18 by stamping. A mounting hole 36 is defined in the side plate 18 below the positioning clips 26. A keyhole-shaped opening 34 and a square opening 38 are defined in the side plate 18 below the resilient clip 27.

Figure 4:
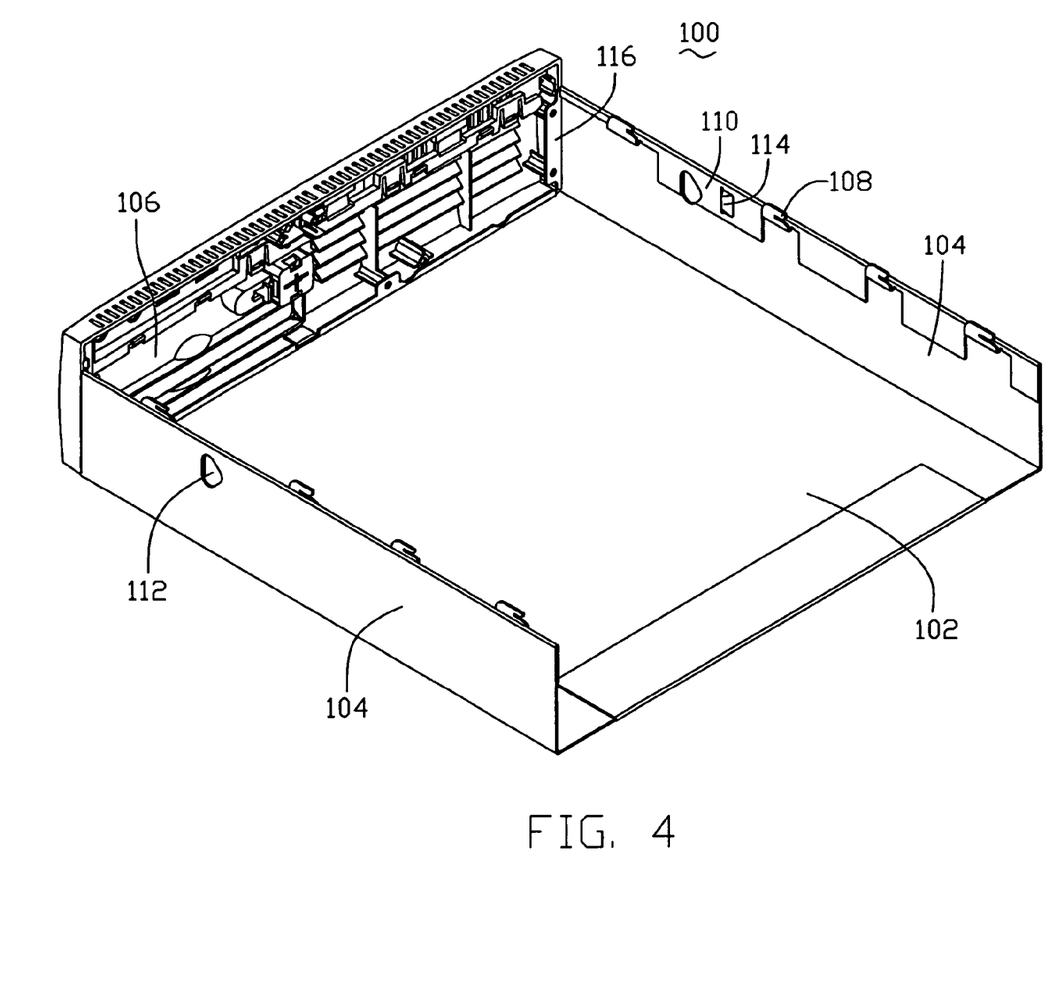
FIG. 4 is another aspect view of the cover.
Figure 5:
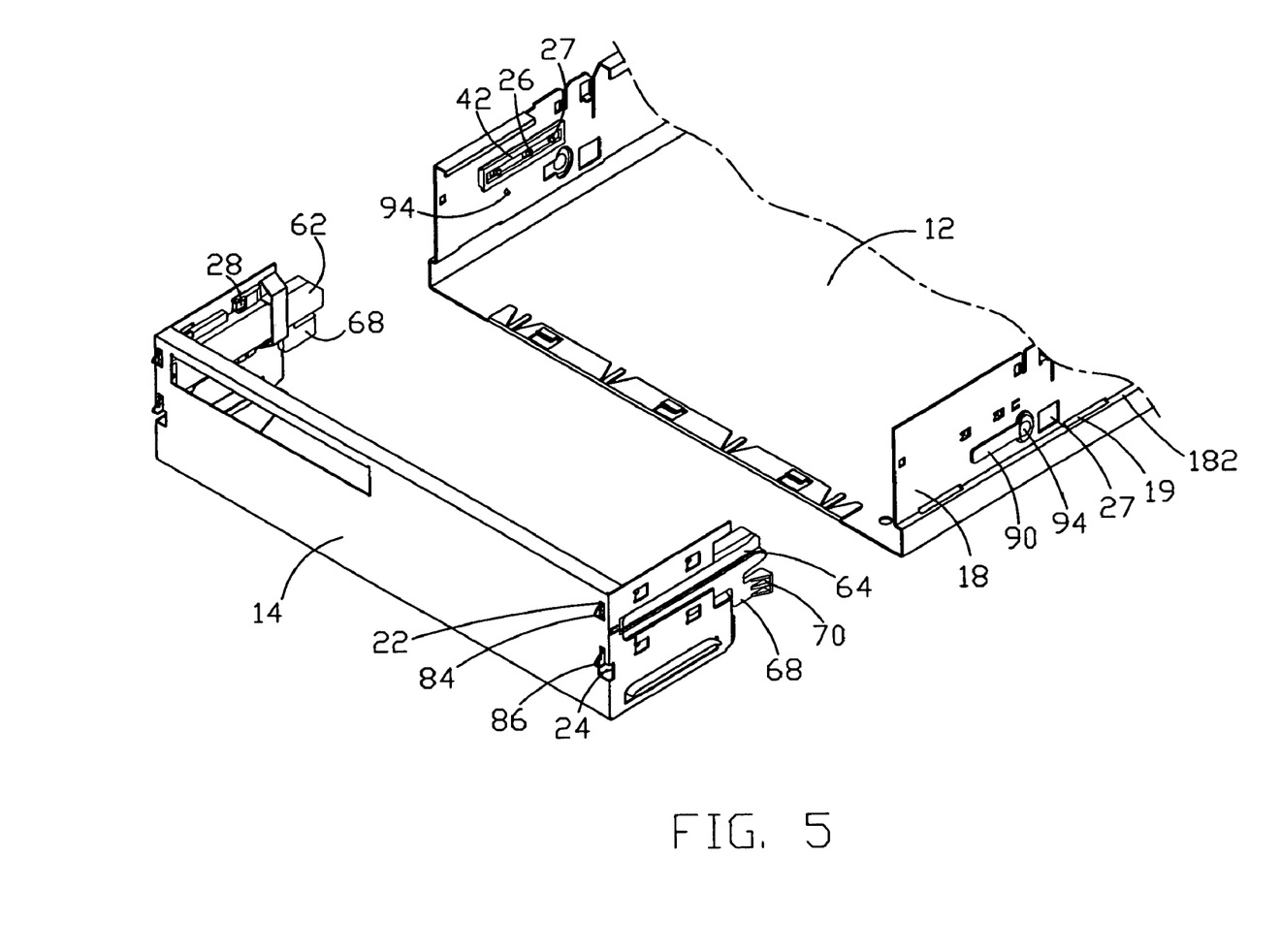
FIG. 5 is a partly assembly view of FIG. 1.
Figure 6:
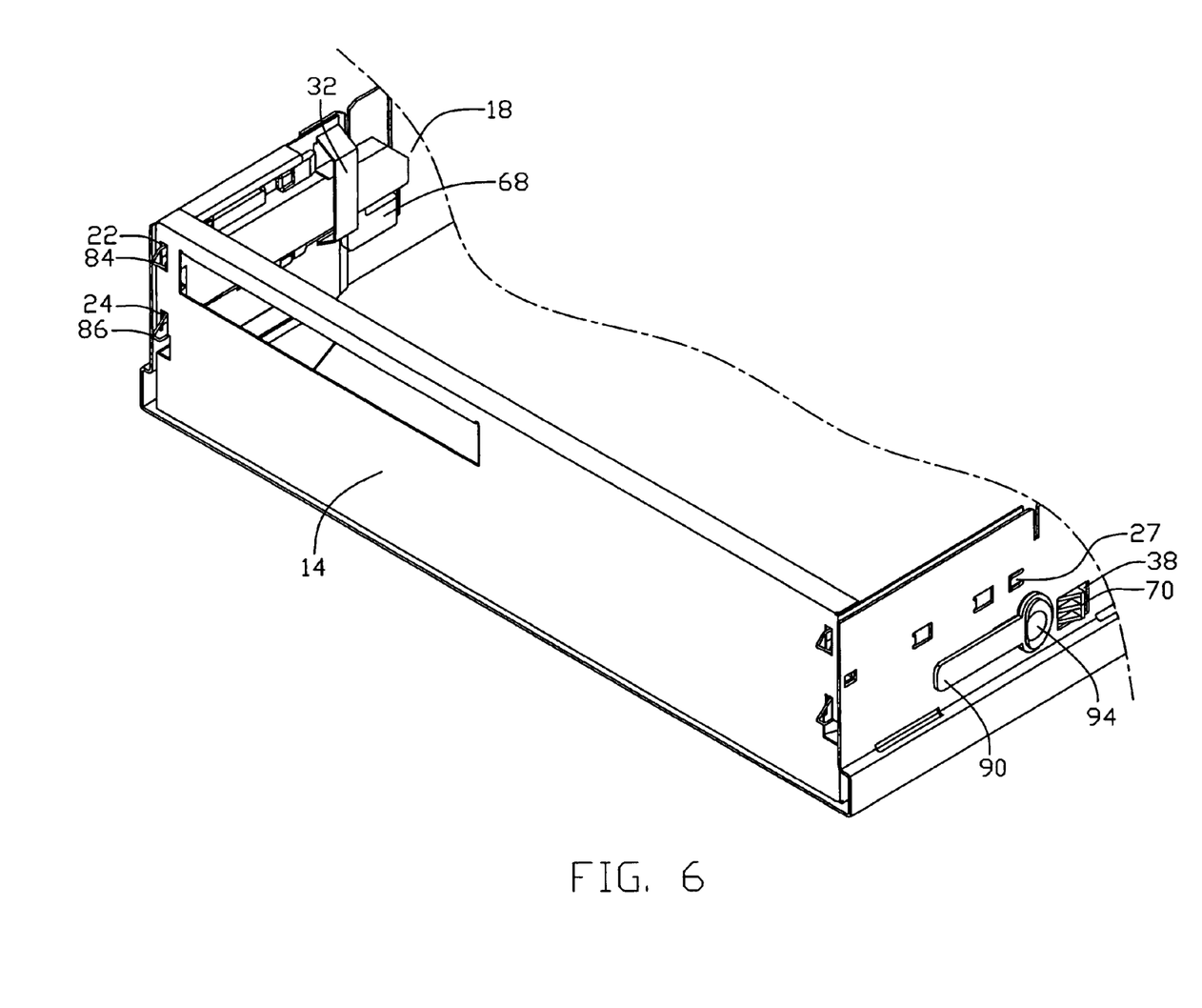
FIG. 6 is a partially view of assembly of FIG. 5.
Figure 7:
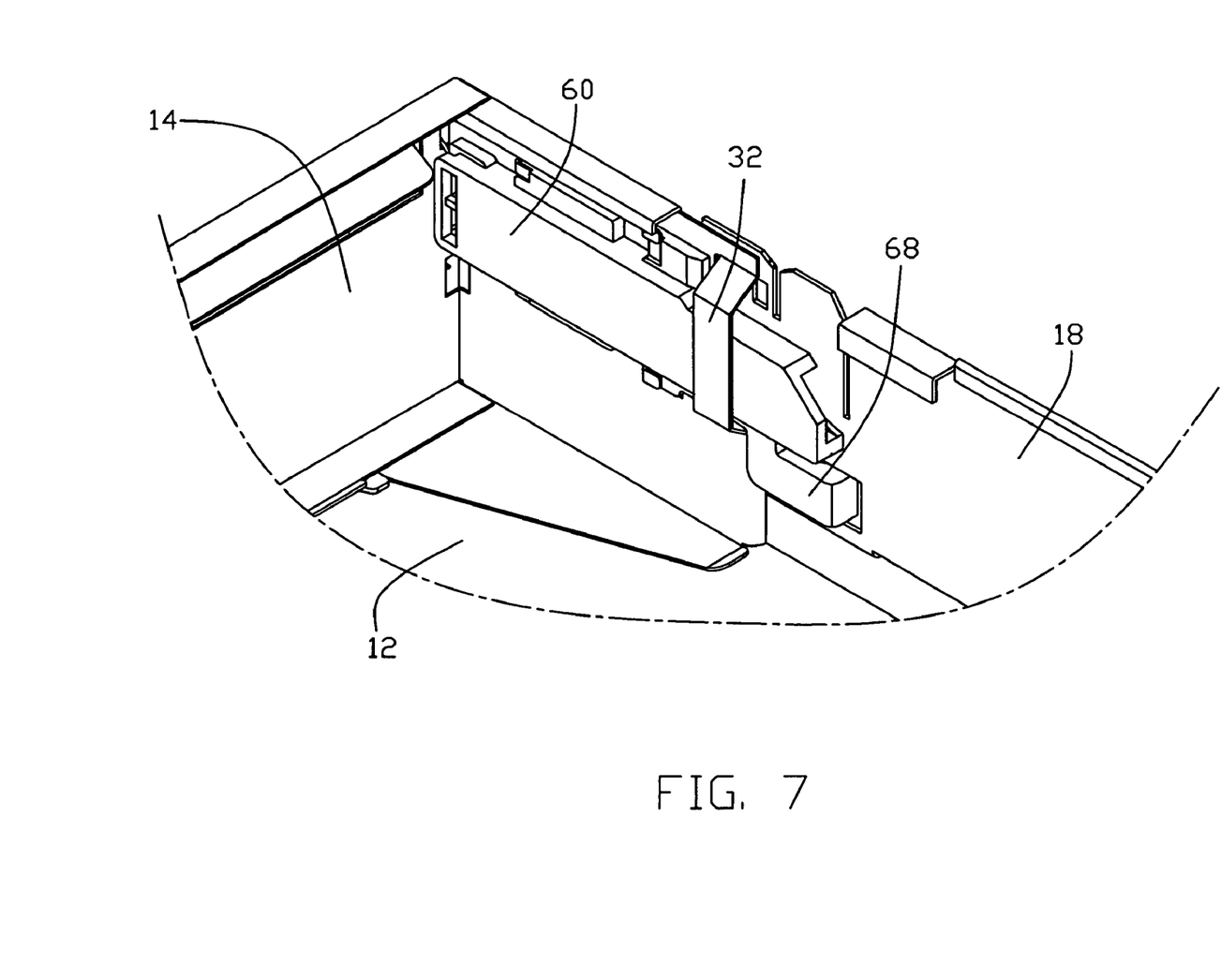
FIG. 7 is an another partially aspect view of the FIG. 6.
Figure 8:
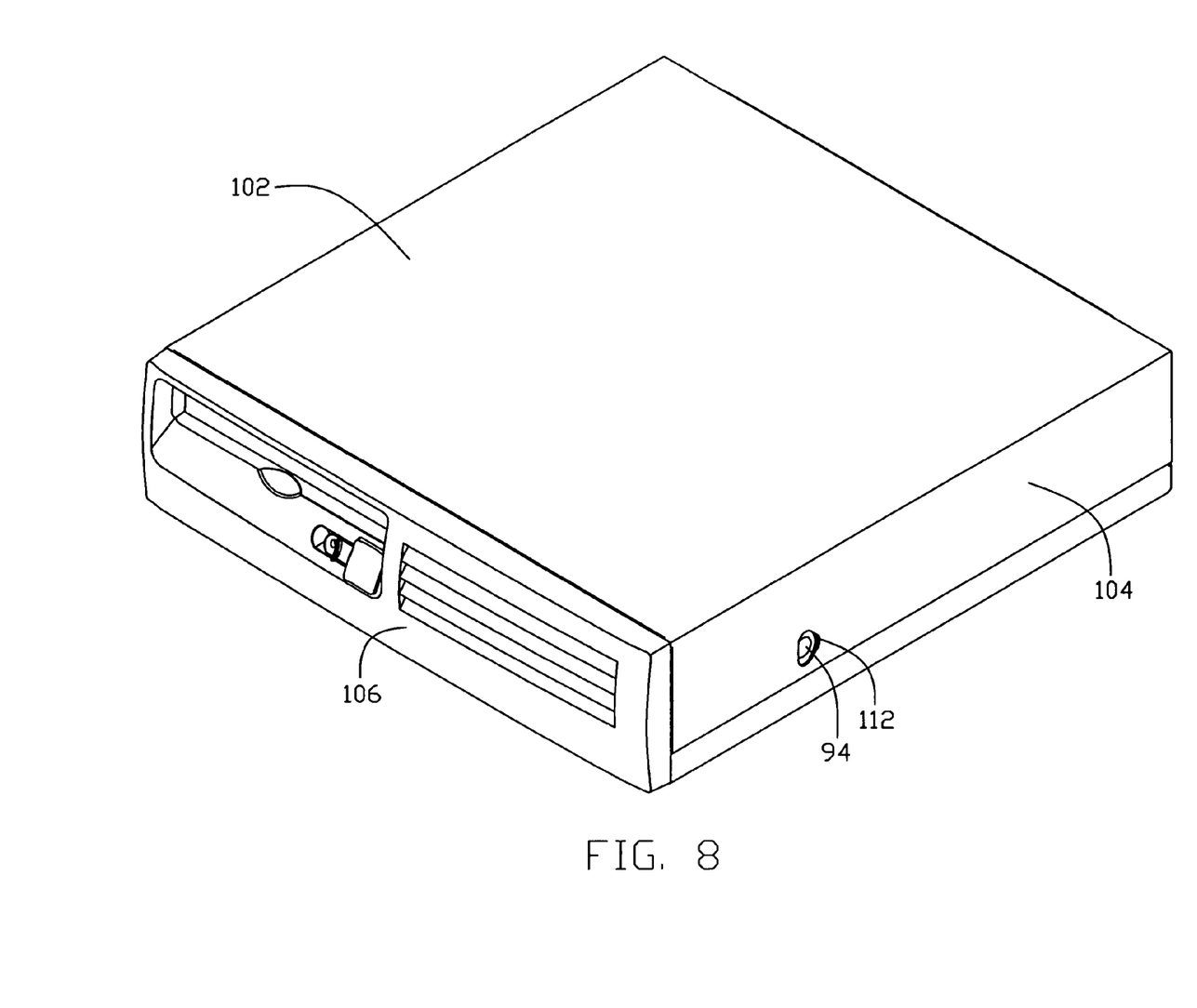
FIG. 8 is an assembly view of FIG. 1.
Figure 9:
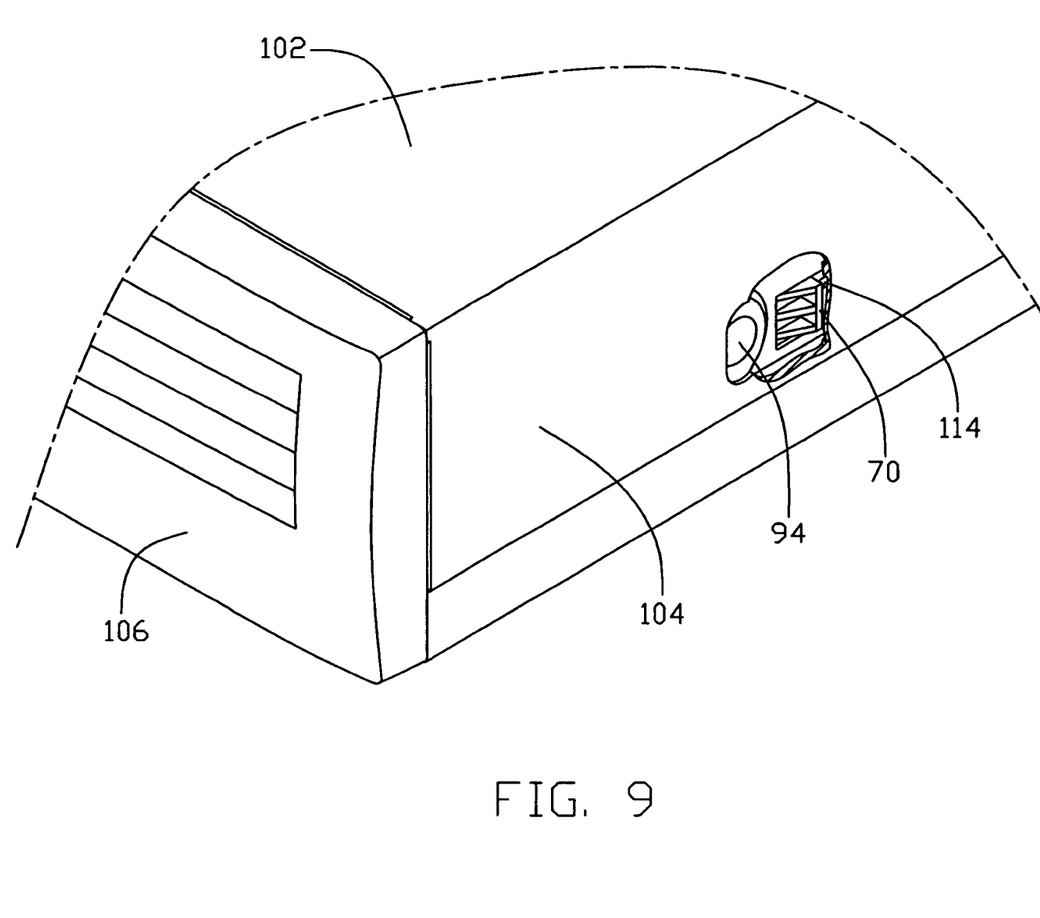
FIG. 9 is a partially enlarged view of FIG. 8, and showing the cover in a locked position.

Referring to FIGS. 1 and 4, the cover 100 is provided with a top wall 102, a pair of side walls 104 perpendicular to the top wall 102 and a front panel mounted on the cover 100 between the side walls 104. A plurality of hooks 108 extends downwardly from a bottom of the side wall 104 corresponding to the slits 19 of the base 10. A through hole 112 is defined in the side wall 104 corresponding to the keyhole-shaped opening 34 of the base 10. A wedge-shaped mounting protrusion 114 is formed inward on the side wall 104 by stamping.

Figure 2:
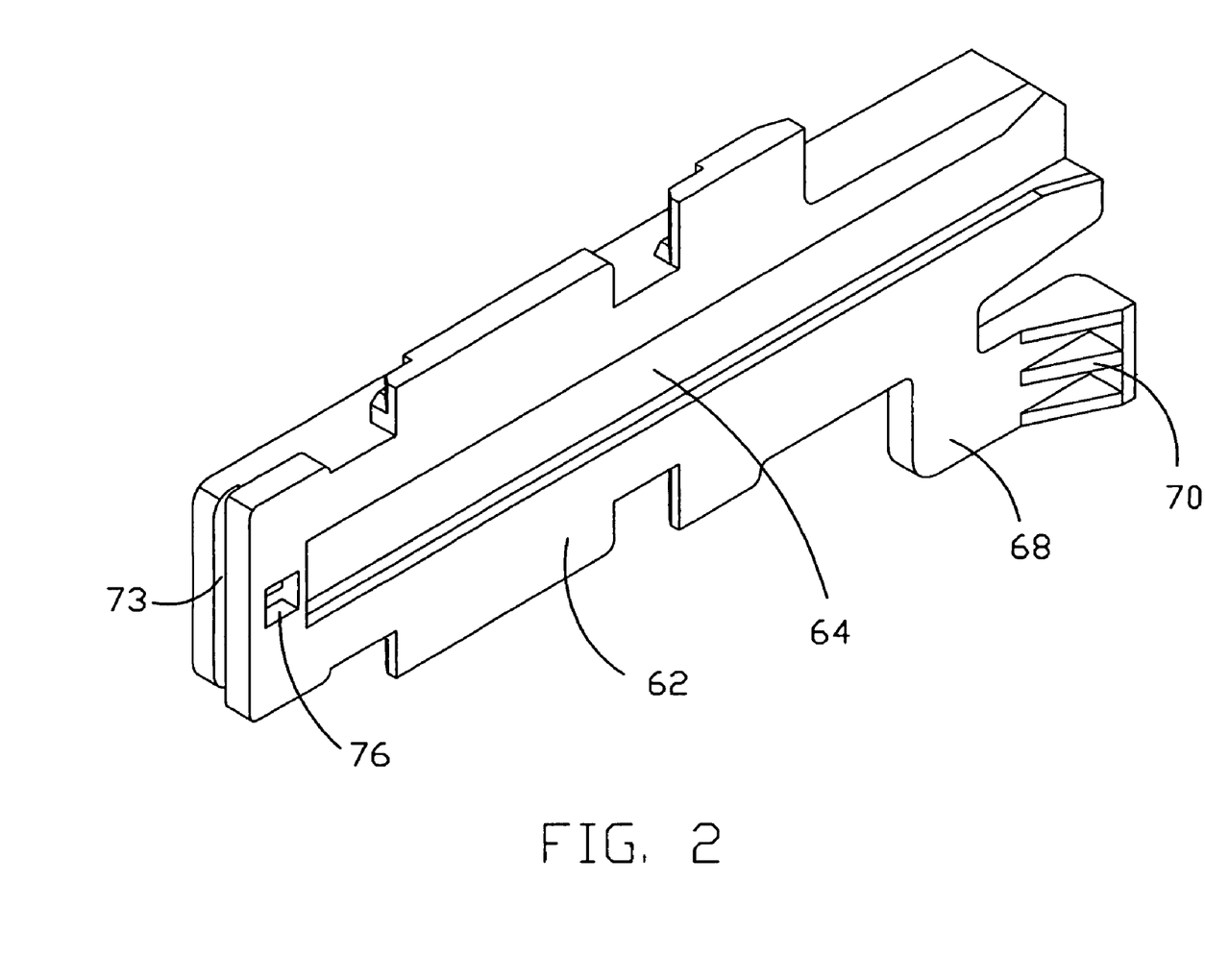
FIG. 2 is another aspect view of the sliding member.
Figure 3:
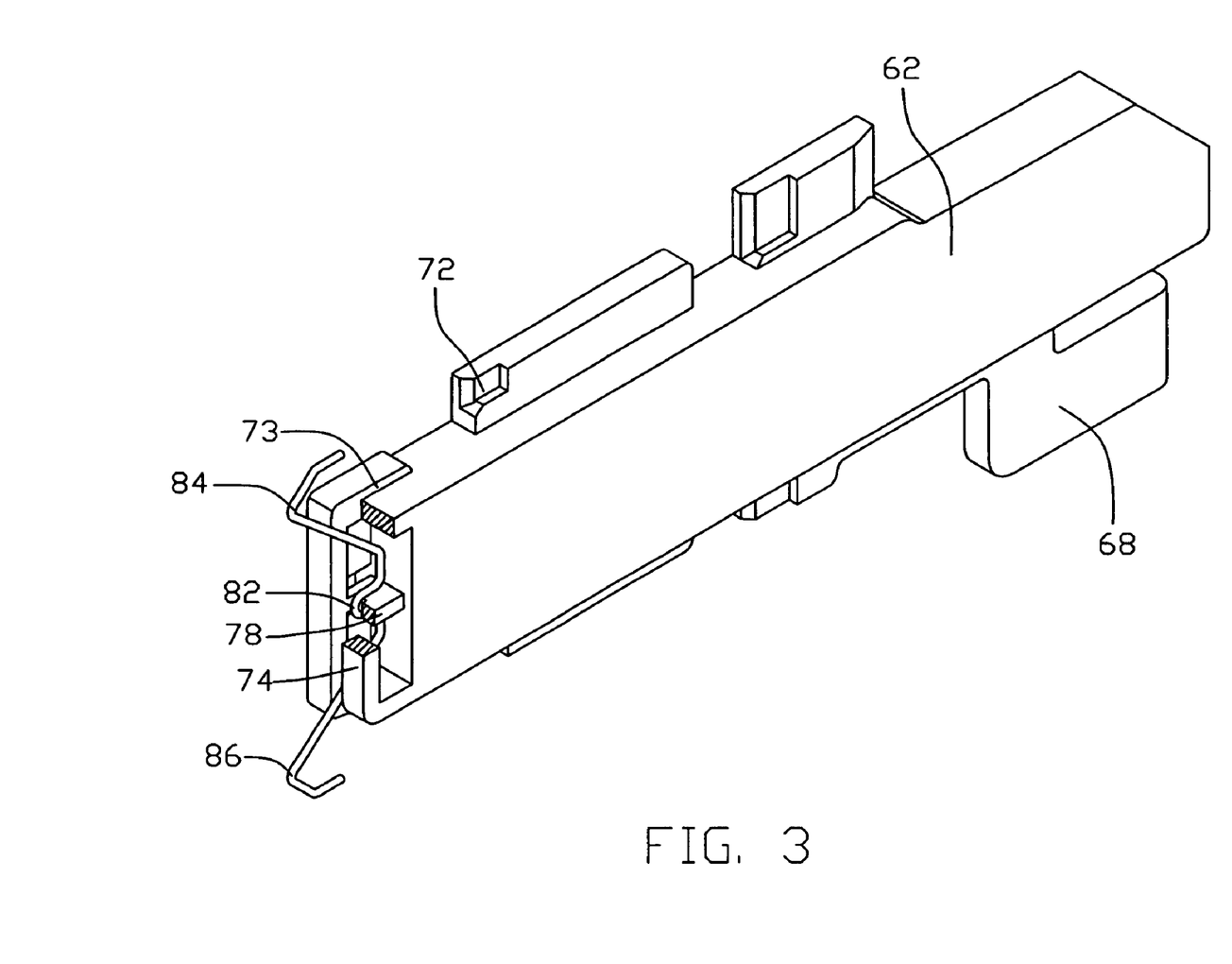
FIG. 3 is an assembly view of the sliding member and the spring.

Referring to FIGS. 1 to 3, each of the latching devices 40 includes a guiding member 42, a sliding member 60, a resilient member 80 and an operating member 90.

The guiding member 42 has an elongated body, and includes a mounting portion 46 and a sliding portion 44 having a width greater than that of the mounting portion 46. A groove 48 is defined in the guiding member 42 in a middle portion. Two positioning holes 50 and a locking hole 52 are defined in the groove 48 for receiving the positioning clips 26 and the resilient clip 27 of the side plate 18 respectively.

The sliding member 60 includes a main body 62 with a sliding slot 64 defined therein. An L-shaped latching portion 68 extends downwardly from a bottom of the sliding member 60 and a wedge-shaped hooking protrusion 70 is formed at an end thereof. A pair of positioning tabs 72 protrudes from both sides of sliding member 60 for engaging with the positioning clips 28. A gap 73 is defined in an end of the sliding member 60, and a securing tab 78 is disposed in the gap 73. The sliding member 60 further defines a positioning hole 76.

The resilient member 80 is an elastically deformable W-shaped metal wire, and has an U-shaped clamp portion 82 in a middle portion and a pair of V-shaped resilient arms 84, 86 at both ends.

The operating member 90 includes an operating portion 94 at one end corresponding to the keyhole-shaped opening 34. A pin 92 protrudes from the other end corresponding to the mounting hole 36.

Referring also FIGS. 6 to 9, in assembly, the positioning clips 26 of the side plate 18 is inserted into the positioning hole 50 of the guiding member 42. The resilient clip 27 is then deformed to secure into the locking hole 52, and the guiding member 42 is thus mounted on the side plate 18. The clamp portion 82 of the resilient member 80 is pushed to clamp the tab 78 of the sliding member 60 as shown in FIG. 4. The sliding member 60 with the resilient member 80 is inserted through the bridge portion 32. The resilient arms 84, 86 pass through the opening 22, 24 respectively. The sliding member 60 is positioned on the inside surface of the side plate 18 with the positioning clips 28 engaging with the positioning tabs 72 and the securing hole 76 receiving the resilient clip 30. Then, the pin 92 of the operating member 90 is fastened into the mounting hole 36 in the outer surface of the side plate 18. The operating portion 94 is placed in the through hole 112. Further, the front plate 14 is pushed to slide into the base 10, and the guiding member 42 is inserted into the sliding slot 64 of the sliding member 60. When the hooking protrusion 70 of the latching portion 68 inserts into the square opening 38, the front plate 14 is thus positioned on the base 10.

The cover 100 is lowered to have the hooks 108 insert into the slits 19 of the base 10, and slides on the side plates 18. The front panel 106 presses the resilient arms 84, 86 out of opening 22, 24 of the front plate 14 to deform elastically. When the mounting protrusion 114 of the side wall 104 passes over and engages with the hooking protrusion 70, the hooks 108 of the cover 100 are secured into the slits 19 of the base 10. The cover 100 is thus mounted on the base 10. The operating portion 94 aligns with the latching portion 68 via the through hole 112.

Figure 10:
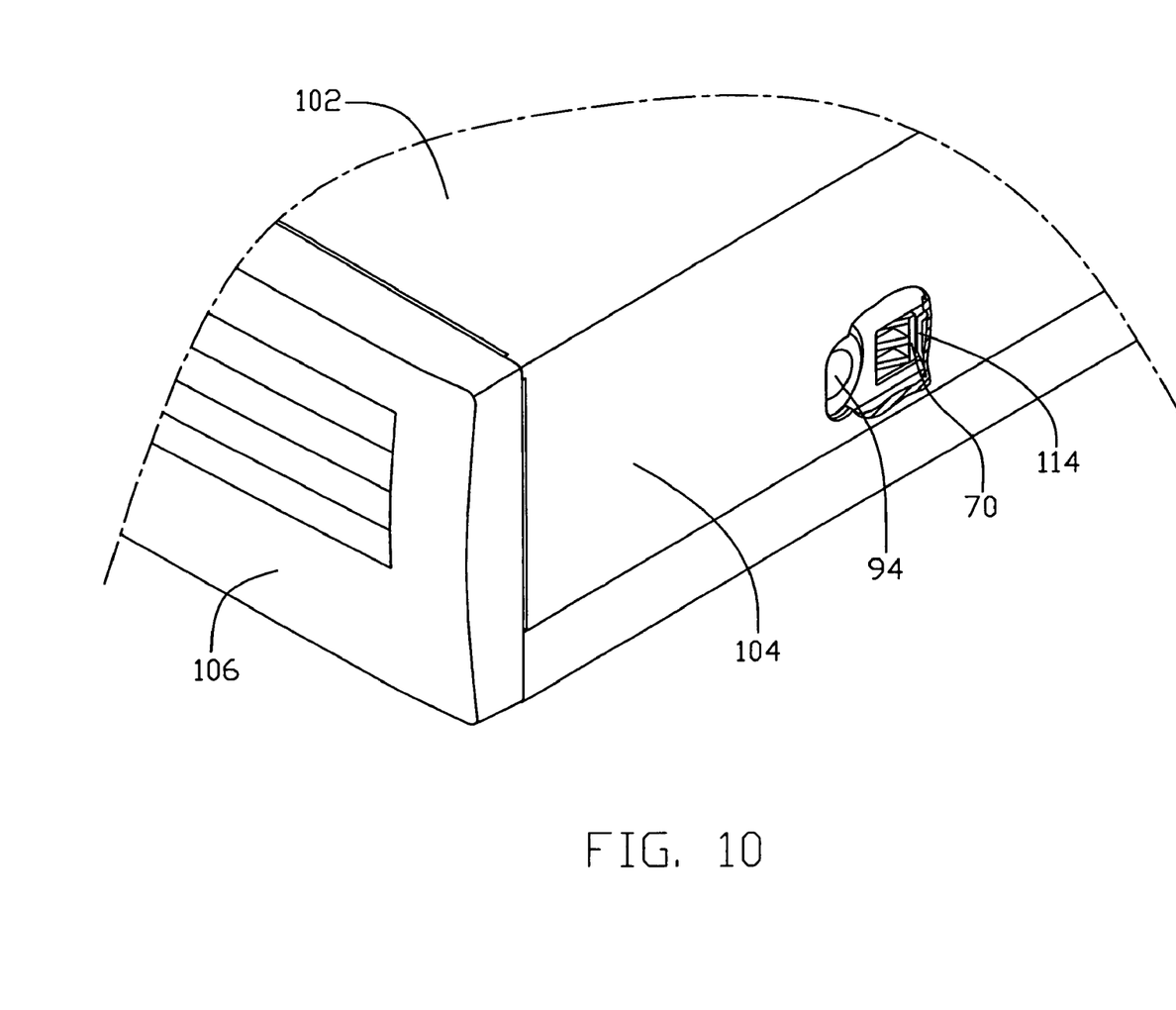
FIG. 10 is similar to FIG. 9, but showing the cover in an unlocked position.

Referring also to FIG. 10, in disassembly of the cover 100, the operating portion 94 of the operating member 90 is pushed inward to urge the latching portion 68 to disengage from the mounting protrusion 114. The resilient member 80 rebounds to push the cover 100 to move forward due to being released thereby. The cover 100 can be lifted from the base 10.

In another alternative embodiment, the sliding member 60 can be also mounted directly on the inside surface of the side wall 114. The guiding member 42 can be thus omitted.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A computer enclosure comprising:
   a base having a latching portion disposed thereon;
   a cover adapted to being mounted to the base, the cover having a mounting protrusion projecting therefrom, the mounting protrusion engaging with the latching portion for preventing the cover moving in a first direction, thereby securing the cover on the base; and
   a resilient member attached to the base and compressed by the cover;
   whereby when the mounting protrusion disengages from the latching portion, the resilient member pushes the cover to move in the first direction due to being released.

2. The computer enclosure as described in claim 1, wherein the base comprises a front plate for a mounting plate bending therefrom.

3. The computer enclosure as described in claim 2, wherein a sliding member is mounted on the mounting plate, and a gap is defined in an end of the sliding member.

4. The computer enclosure as described in claim 3, wherein a securing tab is disposed in the gap of the sliding member for securing the resilient member.

5. The computer enclosure as described in claim 2, wherein two openings are defined in the front plate for the resilient member inserting therethrough.

6. The computer enclosure as described in claim 3, wherein a guiding member is attached to the base, and the sliding member defines a sliding slot for engaging with the guiding member.

7. The computer enclosure as described in claim 3, wherein the latching portion extends from the sliding member, and a hooking protrusion projects from the latching portion for engaging with the mounting protrusion of the cover.

8. The computer enclosure as described in claim 7, wherein a square opening is defined in the base for the hooking protrusion inserting therethrough.

9. The computer enclosure as described in claim 7, further comprising an operating member mounted on the base for driving the latching portion of the sliding member to disengage from the mounting protrusion of the cover.

10. The computer enclosure as described in claim 1, wherein a plurality of hooks extends from the cover, and a plurality of slits is defined in the base for receiving the hooks of the cover.

11. A computer enclosure comprising:
    a base;
    a cover adapted to being mounted on the base;
    a latching device for engaging the cover with the base;
    an operating member for driving the latching device to disengage the cover from the base; and
    a resilient member attached to the base and compressed by the cover;
    wherein when the latching device disengages the cover from the base, the resilient member rebounds in a direction to move the cover relative to the base along the direction.

12. The computer enclosure as described in claim 11, wherein two openings are defined in the base for the resilient member inserting therethrough.

13. The computer enclosure as described in claim 11, wherein a keyhole-shaped opening is defined in the base.

14. The computer enclosure as described in claim 13, wherein the latching device comprising a latching portion disposed on the base and a mounting protrusion projecting from the cover.

15. The computer enclosure as described in claim 14, wherein a hooking protrusion projects from the latching portion and passing through the keyhole-shaped opening for engaging with the mounting protrusion of the cover.

16. A computer enclosure comprising:
a base comprising a front plate defining an opening;
a cover adapted to being mounted on the base;
a resilient member inserting through the opening of the base and being compressed by the cover; and
a latching device for engaging the cover with the base; whereby
when the latching device disengages the cover from the base, the resilient member is released and rebounds to drive the cover to slide on the base.

17. The computer enclosure as described in claim 16, further comprising an operating member mounted on the base for driving the latching device to disengage the cover from the base.

18. The computer enclosure as described in claim 16, wherein the latching device comprises a latching portion disposed on the base and a mounting protrusion projecting from the cover.

19. The computer enclosure as described in claim 18, wherein a hooking protrusion projects from the latching portion for engaging with the mounting protrusion.

20. The computer enclosure as described in claim 19, wherein a keyhole-shaped opening is defined in the base for the hooking protrusion passing therethrough.

* * * * *